US012801331B2

(12) United States Patent
Shimizu

(10) Patent No.: US 12,801,331 B2
(45) Date of Patent: Nov. 17, 2026

(54) INFORMATION PROCESSING SYSTEM, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Tomoyuki Shimizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/449,695

(22) Filed: Aug. 14, 2023

(65) Prior Publication Data

US 2024/0311071 A1 Sep. 19, 2024

(30) Foreign Application Priority Data

Mar. 15, 2023 (JP) ................................ 2023-040940

(51) Int. Cl.

| | |
|---|---|
| ***G06F 3/14*** | (2006.01) |
| ***G06F 3/0482*** | (2013.01) |
| ***G06T 11/00*** | (2026.01) |
| ***G06V 20/20*** | (2022.01) |
| ***H04N 23/60*** | (2023.01) |

(52) U.S. Cl.

CPC .......... *G06F 3/1462* (2013.01); *G06F 3/0482* (2013.01); *G06T 11/00* (2013.01); *G06V 20/20* (2022.01); *H04N 23/64* (2023.01)

(58) Field of Classification Search

CPC ....... G06F 3/1462; G06F 3/0482; G06T 7/70; G06T 11/00; H04N 23/64; G06V 20/20; G06Q 10/20

USPC .......................................................... 345/418

See application file for complete search history.

(56) References Cited

U.S. PATENT DOCUMENTS

| | | | | |
|---|---|---|---|---|
| 9,792,730 B2 * | 10/2017 | Saito | G06V 20/20 | |
| 2005/0289182 A1 * | 12/2005 | Pandian | G06Q 10/10 | |
| 2014/0368541 A1 * | 12/2014 | Sakurai | G06V 20/20 | 345/633 |

(Continued)

FOREIGN PATENT DOCUMENTS

| | | |
|---|---|---|
| JP | 2007137658 | 6/2007 |
| JP | 2014157609 | 8/2014 |
| WO | 2018222756 | 12/2018 |

OTHER PUBLICATIONS

Angelopoulos J, Mourtzis D. An Intelligent Product Service System for Adaptive Maintenance of Engineered-to-Order Manufacturing Equipment Assisted by Augmented Reality. Appl. Sci. 2022; 12:5349.*

(Continued)

*Primary Examiner* — Phu K Nguyen

(74) *Attorney, Agent, or Firm* — JCIPRNET

(57) ABSTRACT

An information processing system includes one or plural processors configured to: acquire additional information that is input by a first user; acquire a mark image corresponding to a part of a target object for which the additional information is input by the first user; cause a terminal apparatus of a second user to display the mark image; and cause the terminal apparatus of the second user to display the additional information based on a relationship between the mark image and the part of the target object.

12 Claims, 12 Drawing Sheets

(56) References Cited

U.S. PATENT DOCUMENTS

| | | | | |
|---|---|---|---|---|
| 2015/0192774 | A1* | 7/2015 | Watanabe | G06Q 10/08 345/8 |
| 2016/0049009 | A1* | 2/2016 | Hara | G06V 20/20 345/633 |
| 2020/0151450 | A1 | 5/2020 | Hishinuma et al. | |
| 2020/0288076 | A1* | 9/2020 | Kozuka | H04N 25/40 |

OTHER PUBLICATIONS

Shyr WJ, Tsai CJ, Lin CM, Liau HM. Development and assessment of augmented reality technology for using in an equipment maintenance and diagnostic system. Sustainability. Sep. 26, 2022; 14(19):12154.*

Liu JH, Tsai CY, Li JZ, Wang CC. Design and Implementation of an Augmented Reality-based Interactive and Real-time Wind Turbine Maintenance Auxiliary Platform System. Sensors & Materials. Nov. 30, 2023;35.*

"Search Report of Europe Counterpart Application", issued on Jan. 24, 2024, pp. 1-8.

* cited by examiner

FIG. 4A

| 101<br>ADDITIONAL INFORMATION ID | 102<br>RECORDING DATE AND TIME | 103<br>OBJECT/ COMPONENT AS RECORDING TARGET | 104<br>COORDINATE OF DESIGNATED SPECIFIC PORTION | 105<br>TITLE | 106<br>MESSAGE | 107<br>COORDINATE OF WORK TERMINAL | 108<br>DIRECTION OF WORK TERMINAL | 109<br>LIGHTING STATE OF WORK TERMINAL | 110<br>RECTANGULAR-CONTOUR IMAGE FOR ALIGNMENT |
|---|---|---|---|---|---|---|---|---|---|
| A | mm/dd/yyyy HH:MM:SS | TONER CARTRIDGE (YELLOW) | <NONE> | REMAINING AMOUNT 10% OF YELLOW TONER | REMAINING AMOUNT OF TONER IS INSUFFICIENT. REPLACEMENT IS REQUIRED. | · x-COORDINATE<br>· y-COORDINATE<br>· z-COORDINATE | · x-AXIS ROTATION DEGREE<br>· y-AXIS ROTATION DEGREE<br>· z-AXIS ROTATION DEGREE | LIGHTS-OUT | NAME: TONER CARTRIDGE (YELLOW)<br>IMAGE DATA: <BINARY DATA><br>RELATIVE COORDINATE ON DISPLAY: x, y<br>DISPLAY RESOLUTION: width, height |
| B | mm/dd/yyyy HH:MM:SS | DOCUMENT GLASS | · x-COORDINATE<br>· y-COORDINATE<br>· z-COORDINATE | SCRATCH 1 OF SCRATCHES OF DOCUMENT GLASS | THERE IS SCRATCH THAT AFFECTS SCANNING ACCURACY. PLEASE CHECK. | · x-COORDINATE<br>· y-COORDINATE<br>· z-COORDINATE | · x-AXIS ROTATION DEGREE<br>· y-AXIS ROTATION DEGREE<br>· z-AXIS ROTATION DEGREE | LIGHTING | NAME: DOCUMENT GLASS<br>IMAGE DATA: <BINARY DATA><br>RELATIVE COORDINATE ON DISPLAY: x, y<br>DISPLAY RESOLUTION: width, height |
| B′ | mm/dd/yyyy HH:MM:SS | DOCUMENT GLASS | · x-COORDINATE<br>· y-COORDINATE<br>· z-COORDINATE | SCRATCH 2 OF SCRATCHES OF DOCUMENT GLASS | THERE IS SCRATCH SLIGHTER THAN SCRATCH 1 OF SCRATCHES OF DOCUMENT GLASS. | · x-COORDINATE<br>· y-COORDINATE<br>· z-COORDINATE | · x-AXIS ROTATION DEGREE<br>· y-AXIS ROTATION DEGREE<br>· z-AXIS ROTATION DEGREE | LIGHTING | |
| C | mm/dd/yyyy HH:MM:SS | <NONE> | · x-COORDINATE<br>· y-COORDINATE<br>· z-COORDINATE | DAMAGE OF LAN CABLE OUTLET | DAMAGE IS FOUND BY CHANCE DURING MAINTENANCE WORK. DAMAGE APPEARS AT UNUSED OUTLET IN CURRENT STATE. | · x-COORDINATE<br>· y-COORDINATE<br>· z-COORDINATE | · x-AXIS ROTATION DEGREE<br>· y-AXIS ROTATION DEGREE<br>· z-AXIS ROTATION DEGREE | LIGHTS-OUT | <NONE> |

FIG. 4B

| CONFIRMATION INFORMATION ID (111) | ADDITIONAL INFORMATION ID OF TARGET (112) | RECORDING DATE AND TIME (113) | CORRESPONDING CONTENT (114) |
|---|---|---|---|
| 1 | A | mm/dd/yyyy HH:MM:SS | YELLOW TONER CARTRIDGE IS REPLACED. |
| 2 | B | mm/dd/yyyy HH:MM:SS | BIG AND DEEP SCRATCH IS CONFIRMED. PROCEDURE FOR REPLACEMENT OF DOCUMENT GLASS IS PERFORMED. |

INFORMATION PROCESSING SYSTEM, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2023-040940 filed Mar. 15, 2023.

BACKGROUND

(i) Technical Field

The present invention relates to an information processing system, a non-transitory computer readable medium storing a program, and an information processing method.

(ii) Related Art

In JP2007-137658A, in order to accurately recognize a state of maintenance/inspection work, a maintenance/inspection management system that performs, in a case where the maintenance and inspection work is completed, imaging of a completed state by using an imaging function of an information transmitter and transmits an image obtained by performing imaging to a monitoring center is disclosed.

In JP2014-157609A, in order to perform work instructions according to roles of persons involved in work and confirmation work using check sheets in real time, a remote quality control system that registers and collects in real time a confirmation status of various check sheets and pictures related to work to ensure quality and shares information together with a workflow for related parties is disclosed.

SUMMARY

In a case where work content of a first user is handed over to a second user, communication matters may be handed over. At that time, there is a problem that communication matters may not be transmitted well to the second user. For example, in a case where the second user tries to confirm a communication matter by the first user and viewpoints of the first user and the second user are different, a situation where the information is not well transmitted may occur.

Aspects of non-limiting embodiments of the present disclosure relate to an information processing system, a non-transitory computer readable medium storing a program, and an information processing method that are easily transmit information from the first user to the second user, as compared with a case where viewpoints of the first user and the second user are not considered.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: one or a plurality of processors configured to: acquire additional information that is input by a first user; acquire a mark image corresponding to a part of a target object for which the additional information is input by the first user; cause a terminal apparatus of a second user to display the mark image; and cause the terminal apparatus of the second user to display the additional information based on a relationship between the mark image and the part of the target object.

BRIEF DESCRIPTION OF THE DRAWINGS

Exemplary embodiment(s) of the present invention will be described in detail based on the following figures, wherein:

FIG. 4A and FIG. 4B are diagrams illustrating an example of information stored in an additional information management/storage unit, FIG. 4A is a diagram illustrating a list of information related to additional information that is input by a first user, and FIG. 4B is a diagram illustrating a list of information related to confirmation information that is input by a second user;

FIG. 8A is a diagram illustrating a display screen example in a case of receiving recording of a viewpoint from the first user, and FIG. 8B is a diagram illustrating a display screen example in a case of receiving selection of the mark image from the first user;

DETAILED DESCRIPTION OF THE INVENTION

Hereinafter, exemplary embodiments of the present invention will be described in detail with reference to the accompanying drawings.

Configuration of Information Processing System

Figure 1:
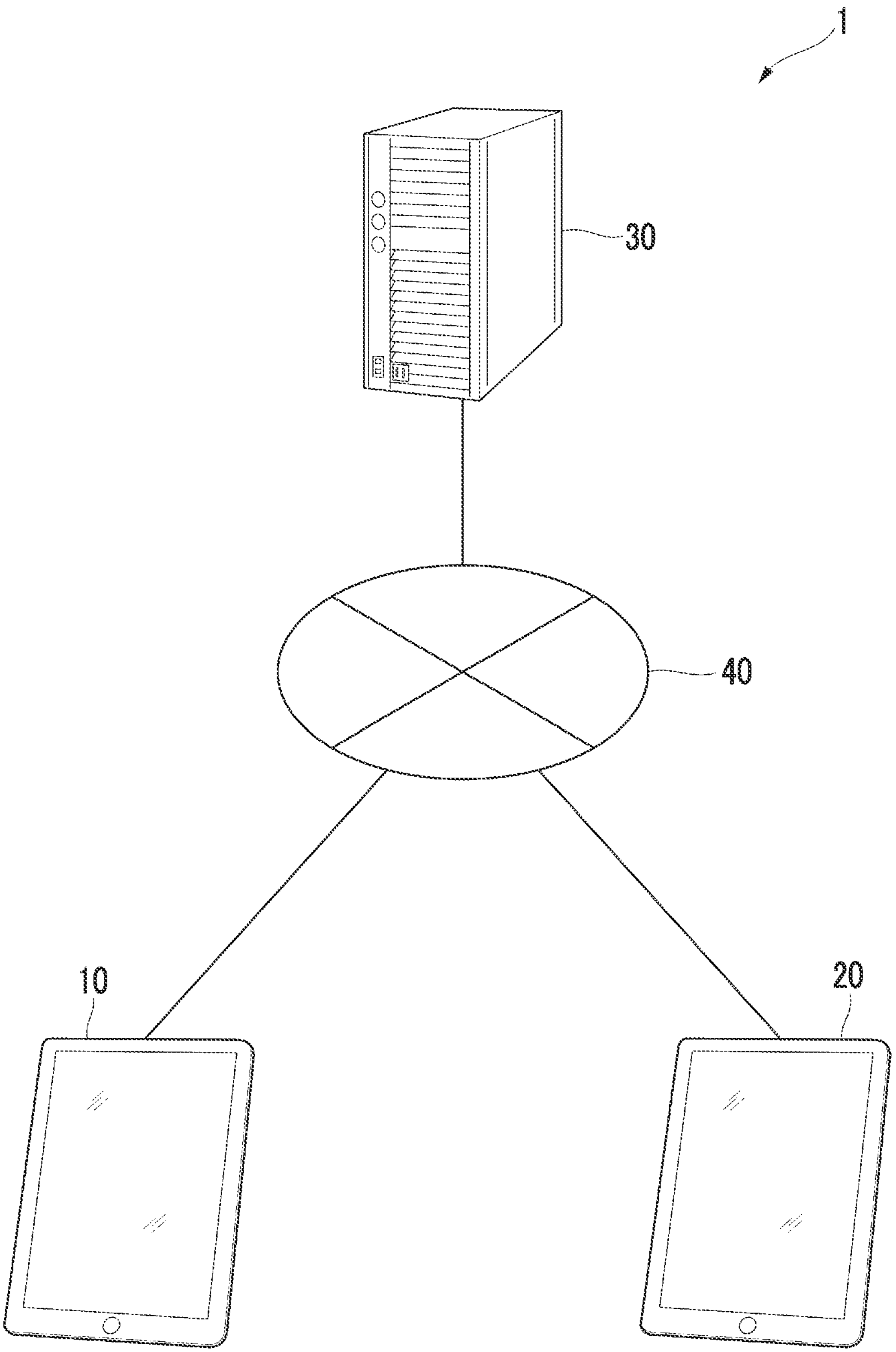
FIG. 1 is a diagram illustrating a configuration example of an information processing system according to an exemplary embodiment.

FIG. 1 is a diagram illustrating a configuration example of an information processing system according to an exemplary embodiment.

The information processing system 1 includes a first user terminal 10, a second user terminal 20, and a management server 30. The first user terminal 10, the second user terminal 20, and the management server 30 are connected to each other via a network 40.

The first user terminal 10 is a terminal that is used by a first user to record communication matters. The first user is, for example, a predecessor in work, and the first user uses the information processing system 1 to transmit content of work to a second user who is a successor. The first user terminal 10 has, for example, a camera function, and the first user visually recognizes a target object on which work is performed via the first user terminal 10. The first user performs maintenance of a target object according to, for example, an AR manual displayed on the first user terminal 10. The first user inputs additional information to be transmitted to the second user, such as a record of work performed in maintenance, to the first user terminal 10 in association with a work target portion. The first user inputs additional information for each of pieces of work displayed by the AR manual.

The first user terminal 10 acquires the additional information that is input by the first user. The additional information is, for example, a record of content of work performed by the first user. In addition, the first user terminal 10 acquires a mark image corresponding to a part of a target object for which the additional information is input by the first user. The mark image is a guide that allows the second user to match a viewpoint with the first user, and the first user terminal 10 acquires the mark image in correspondence with a part of an actual work target object.

The first user is not limited to an actual worker, and for example, a remote assistant may input the additional information.

The second user terminal 20 is a terminal used by the second user to confirm communication matters from the first user. The second user terminal 20 has, for example, a camera function, and the second user visually recognizes a target object on which work is performed via the second user terminal 20. The second user terminal 20 displays the mark image acquired by the first user terminal 10 on a terminal screen, and displays additional information that is input by the first user based on a relationship between the mark image and a part of the target object.

The second user terminal 20 displays additional information, for example, in a case where the mark image and a part of the target object are in a relationship in which it can be determined that viewpoints of the first user and the second user substantially match with each other. The case where it can be determined that the viewpoints of the first user and the second user substantially match with each other is, for example, a case where the mark image and a part of the target object match with each other on a screen of the second user terminal 20. Further, even in a case where the mark image and a part of the target object do not completely match with each other, the additional information may be displayed. For example, in a case where a part of the target object is included in the mark image and it can be considered that the viewpoints match with each other, the additional information may be displayed.

Further, the second user terminal 20 may be configured to receive input of confirmation information indicating that the second user confirms the additional information.

The first user terminal 10 and the second user terminal 20 are implemented by, for example, a computer, a tablet-type information terminal, or another information processing apparatus. Further, the first user terminal 10 and the second user terminal 20 may be glass-type terminals such as a head mounted display (HMD). Further, the first user terminal 10 and the second user terminal 20 may be the identical terminal. In a case where the first user terminal 10 and the second user terminal 20 are the identical terminal, the second user uses the first user terminal 10, which is used by the first user, as the second user terminal 20.

The management server 30 stores manuals of pieces of work performed by the first user and the second user, and causes the first user terminal 10 and the second user terminal 20 to display the manuals as necessary. Further, the management server 30 acquires the additional information that is input by the first user and information related to the mark image from the first user terminal 10. In addition, the management server 30 causes the second user terminal 20 to display the mark image, and causes the second user terminal 20 to display the additional information that is input by the first user based on the relationship between the mark image and a part of the target object.

The management server 30 is realized by, for example, a computer. The management server 30 may be configured by a single computer, or may be realized by distribution processing by a plurality of computers.

The network 40 is an information communication network that performs communication between the first user terminal 10, the second user terminal 20, and the management server 30. A type of the network 40 is not particularly limited as long as the network 40 can transmit and receive data, and may be, for example, the Internet, a local area network (LAN), a wide area network (WAN), or the like. A communication line used for data communication may be wired or wireless. In addition, each apparatus may be configured to be connected via a plurality of networks or communication lines.

Hardware Configuration of Computer

Figure 2:
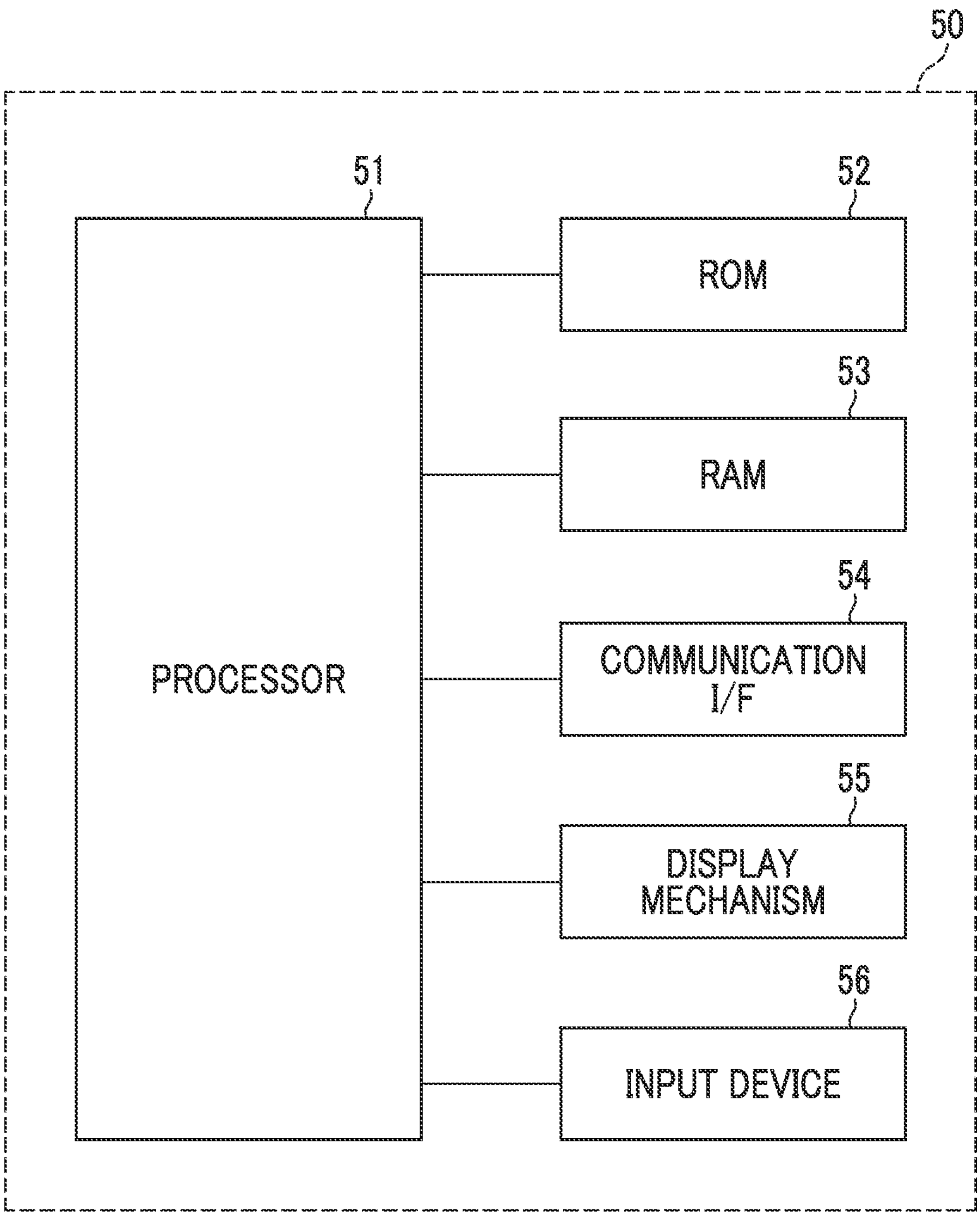
FIG. 2 is a diagram illustrating a hardware configuration example of a computer used as a first user terminal, a second user terminal, and a management server.

FIG. 2 is a diagram illustrating a hardware configuration example of a computer used as the first user terminal 10, the second user terminal 20, and the management server 30. The computer 50 includes a processor 51, a read only memory (ROM) 52, and a random access memory (RAM) 53. The processor 51 is, for example, a central processing unit (CPU), and uses the RAM 53 as a work area to execute a program read from the ROM 52. Further, the computer 50 includes a communication interface 54 for connection to a network and a display mechanism 55 for performing display output on a display. In addition, the computer 50 includes an input device 56 with which an input operation is performed by an operator of the computer 50. The configuration of the computer 50 illustrated in FIG. 2 is only an example, and a computer used in the present exemplary embodiment is not limited to the configuration example in FIG. 2.

Various types of processing to be executed in the exemplary embodiment are executed by one or a plurality of processors.

Functional Configuration of Management Server

Figure 3:
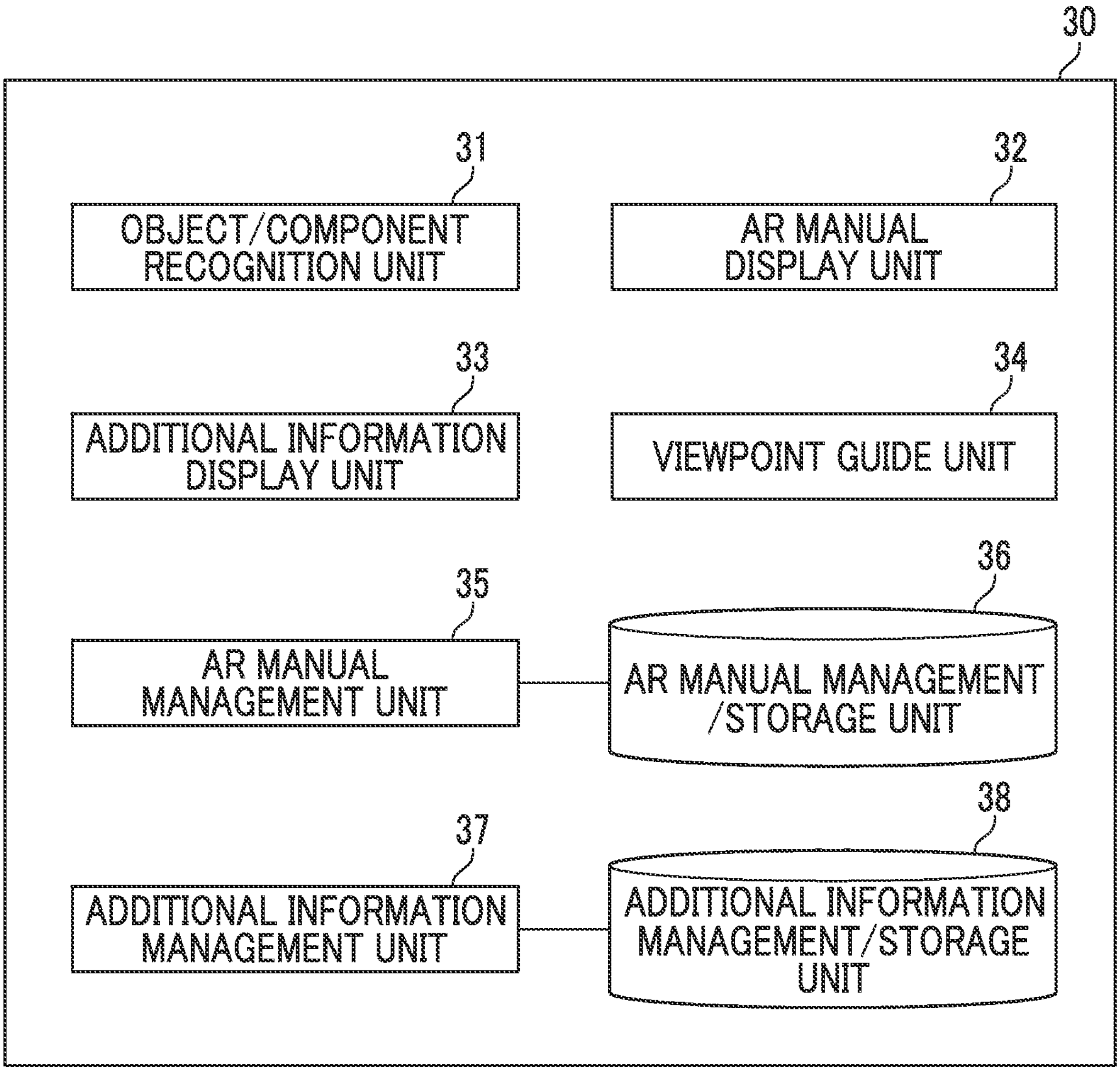
FIG. 3 is a diagram illustrating a functional configuration example of the management server according to the exemplary embodiment.

Next, a functional configuration of the management server 30 will be described. FIG. 3 is a diagram illustrating a functional configuration example of the management server 30 according to the exemplary embodiment.

As illustrated in FIG. 3, the management server 30 includes an object/component recognition unit 31, an AR manual display unit 32, an additional information display unit 33, a viewpoint guide unit 34, an AR manual management unit 35, an AR manual management/storage unit 36, an additional information management unit 37, and an additional information management/storage unit 38.

The object/component recognition unit 31 acquires an image or a moving image which is obtained by performing imaging of a target object for which the additional information is input by the first user, and recognizes a target object for which the additional information is input. In addition, the object/component recognition unit 31 specifies a position at which the additional information is displayed.

The AR manual display unit 32 acquires information related to manuals of pieces of work performed by the first user and the second user from the AR manual management unit 35. Further, the AR manual display unit 32 causes the first user terminal 10 and the second user terminal 20 to display the acquired manuals.

The additional information display unit 33 acquires the additional information that is input by the first user from the additional information management unit 37. Further, the additional information display unit 33 displays the acquired additional information at a display position specified by the object/component recognition unit 31.

The viewpoint guide unit 34 acquires, from the first user terminal 10, information related to the mark image corresponding to a part of the target object for which the additional information is input by the first user. The viewpoint guide unit 34 transmits the information related to the acquired mark image to the additional information management unit 37. The additional information management unit 37 stores the information related to the acquired mark image in the additional information management/storage unit 38. Further, the viewpoint guide unit 34 causes the second user terminal 20 to display the mark image.

The AR manual management unit 35 stores manuals of pieces of work performed by the first user and the second user in the AR manual management/storage unit 36. Further, the AR manual management unit 35 acquires required information from the AR manual management/storage unit 36, and transmits the required information to the AR manual display unit 32.

The AR manual management/storage unit 36 stores information related to manuals of pieces of work performed by the first user and the second user. The information related to the manuals is a work procedure, AR content to be displayed for each procedure, a display position of the AR content, and the like.

The additional information management unit 37 acquires the additional information that is input by the first user from the first user terminal 10, and stores the additional information in the additional information management/storage unit 38. In addition, the additional information management unit 37 acquires the additional information from the additional information management/storage unit 38 as necessary, and transmits the additional information to the additional information display unit 33.

Further, the additional information management unit 37 acquires the confirmation information that is input by the second user from the second user terminal 20, and stores the confirmation information in the additional information management/storage unit 38.

The additional information management/storage unit 38 stores the additional information that is input by the first user and the confirmation information that is input by the second user. The information stored in the additional information management/storage unit 38 will be described with reference to FIG. 4. FIG. 4A and FIG. 4B are diagrams illustrating an example of information stored in the additional information management/storage unit 38, FIG. 4A is a diagram illustrating a list of information related to the additional information that is input by the first user, and FIG. 4B is a diagram illustrating a list of information related to the confirmation information that is input by the second user.

FIG. 4A is a diagram illustrating a list of information related to the additional information that is input by the first user. The additional information management/storage unit 38 stores additional information ID 101, a recording date and time 102, an object/component 103 as a recording target, a coordinate 104 of a designated specific portion, a title 105, a message 106, a coordinate 107 of the work terminal, a direction 108 of the work terminal, a lighting state 109 of the work terminal, and a rectangular-contour image for alignment 110 in association with each other.

The recording date and time 102 is information on a date and time when the additional information is input by the first user.

The object/component 103 as a recording target is a name of the target object for which the additional information is input by the first user.

The coordinate 104 of the designated specific portion is acquired in a case where the target for which the additional information is input by the first user is not an object or a component recognized in the displayed AR manual. In a case where the target for which the additional information is input by the first user is not an object or a component recognized in the displayed AR manual, for example, the first user selects a target for which additional information is to be input on a screen of the first user terminal 10 by a touch operation. The additional information management unit 37 acquires, as the coordinate 104 of the designated specific portion, a position of the target selected by the touch operation on a three-dimensional coordinate system, and stores the position in the additional information management/storage unit 38.

The title 105 and the message 106 are content of the additional information that is input by the first user. The coordinate 107 of the work terminal, the direction 108 of the work terminal, and the lighting state 109 of the work terminal are pieces of information related to a state of the first user terminal 10 when the additional information is input by the first user.

The rectangular-contour image for alignment 110 is a mark image for matching the viewpoints of the first user and the second user. The additional information management/storage unit 38 stores, as the rectangular-contour image for alignment 110, a name of a part of an actual work target object corresponding to the rectangular-contour image for alignment, a format of image data, and a relative coordinate on the display, display resolution, and the like.

FIG. 4B is a diagram illustrating a list of information related to the confirmation information that is input by the second user. The additional information management/storage unit 38 stores a confirmation information ID 111, an additional information ID 112 of the target object, a recording date and time 113, and corresponding content 114 in association with each other.

For example, the confirmation information ID "1" is associated with the confirmation information that is input by the second user in response to the additional information associated with the additional information ID "A" of the target object. The additional information management/storage unit 38 stores the recording date and time 113 "yyyy/mm/dd HH:MM:SS" and the corresponding content 114 "yellow toner cartridge is replaced" in association with the confirmation information ID "1".

Acquisition of Additional Information

Figure 5:
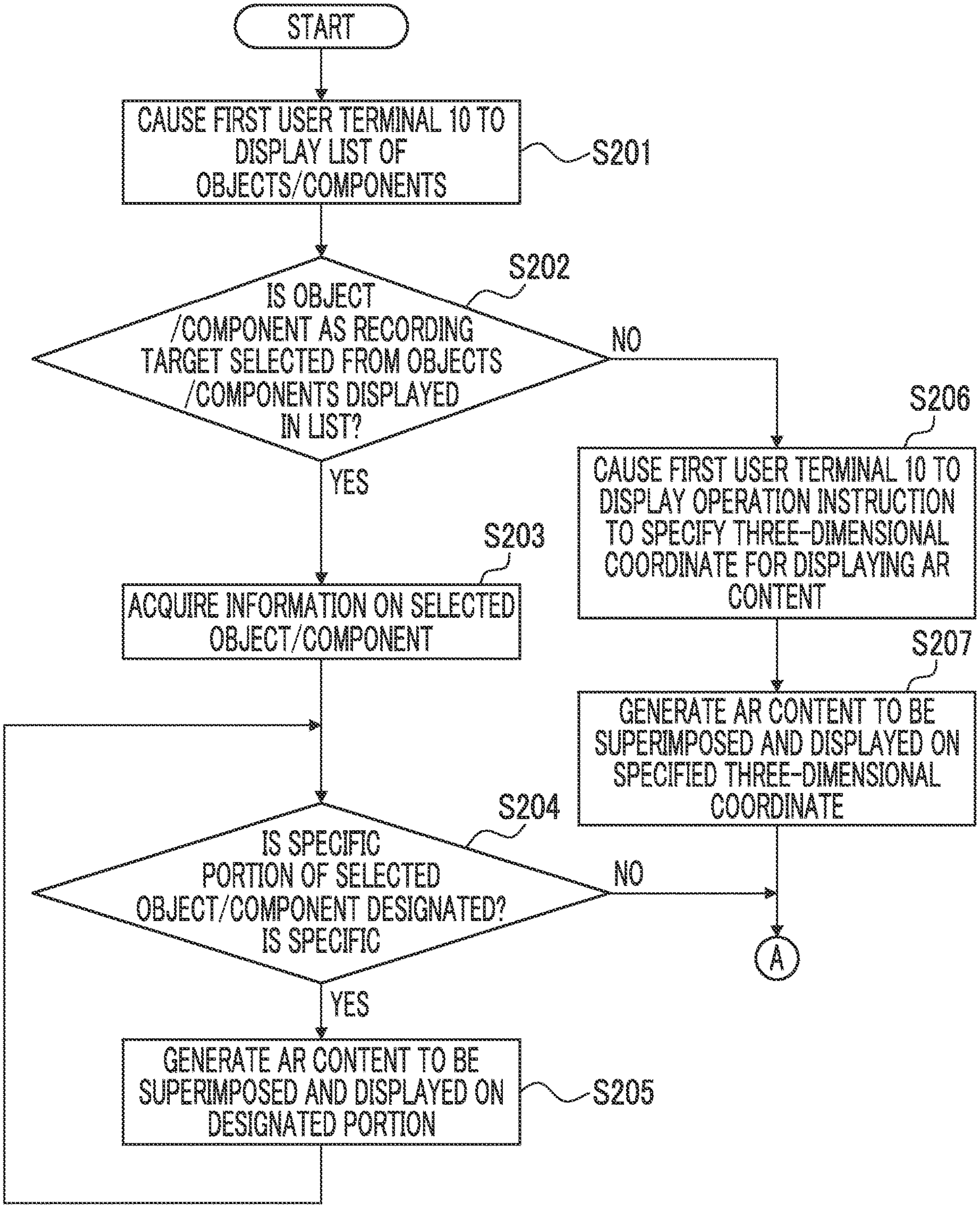
FIG. 5 is a flowchart illustrating an example of a flow of processing in a case where the management server acquires additional information that is input by the first user from the first user terminal.
Figure 6:
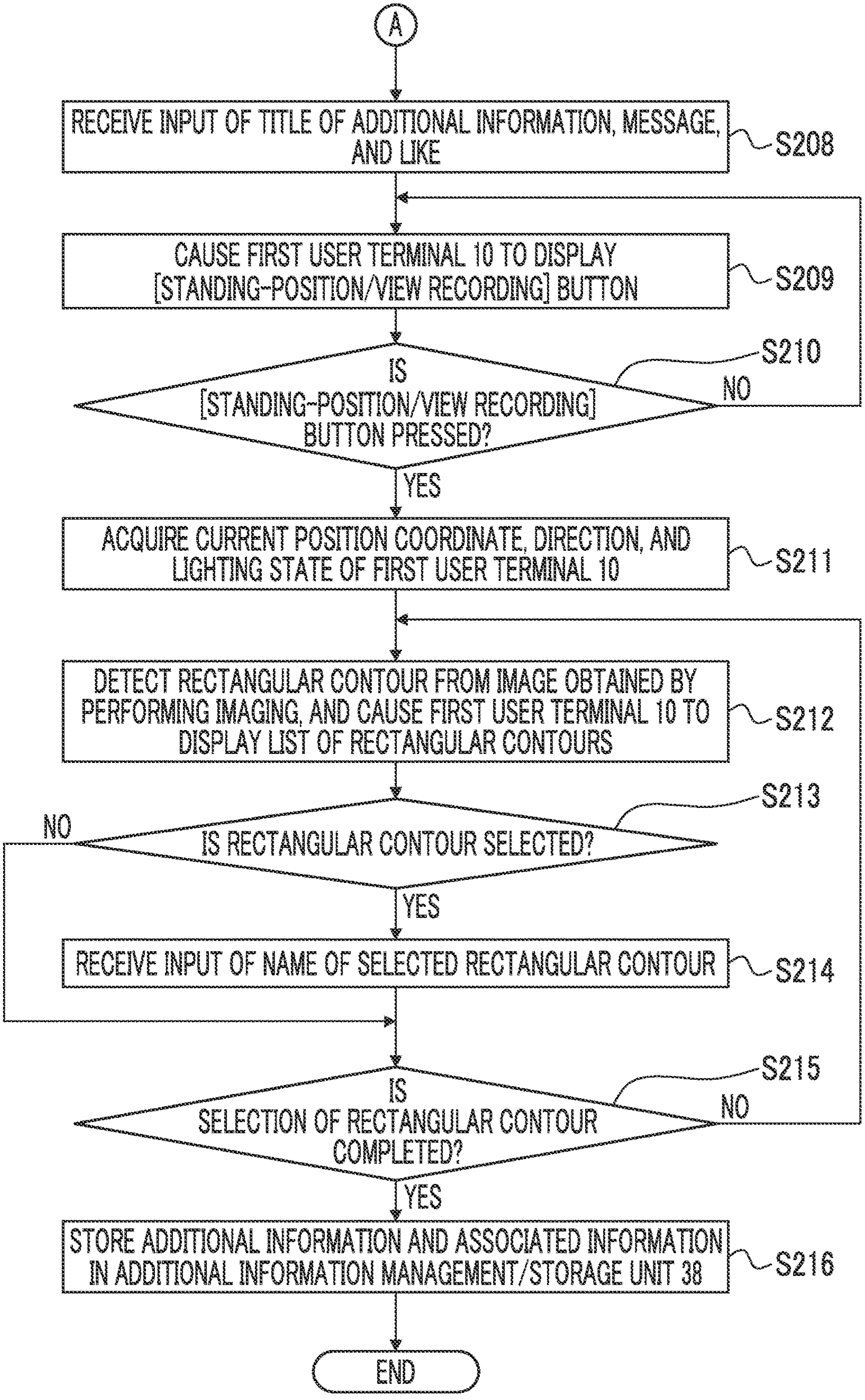
FIG. 6 is a flowchart illustrating an example of a flow of processing in a case where the management server acquires a mark image that is input by the first user from the first user terminal.

Next, a flow of processing in a case where the management server 30 acquires the additional information that is input by the first user and the mark image from the first user terminal 10 will be described with reference to FIG. 5 and FIG. 6. FIG. 5 is a flowchart illustrating an example of a flow of processing in a case where the management server 30 acquires the additional information that is input by the first user from the first user terminal 10, and FIG. 6 is a flowchart illustrating an example of a flow of processing in a case where the management server 30 acquires the mark image that is input by the first user from the first user terminal 10.

In FIG. 5, first, the AR manual display unit 32 causes the first user terminal 10 to display an object/component list (step S201). In step S201, the AR manual display unit 32 causes the first user terminal 10 to display an AR manual related to work performed by the first user, and to display a list of objects or components which are recognized in the AR manual.

Figure 7:
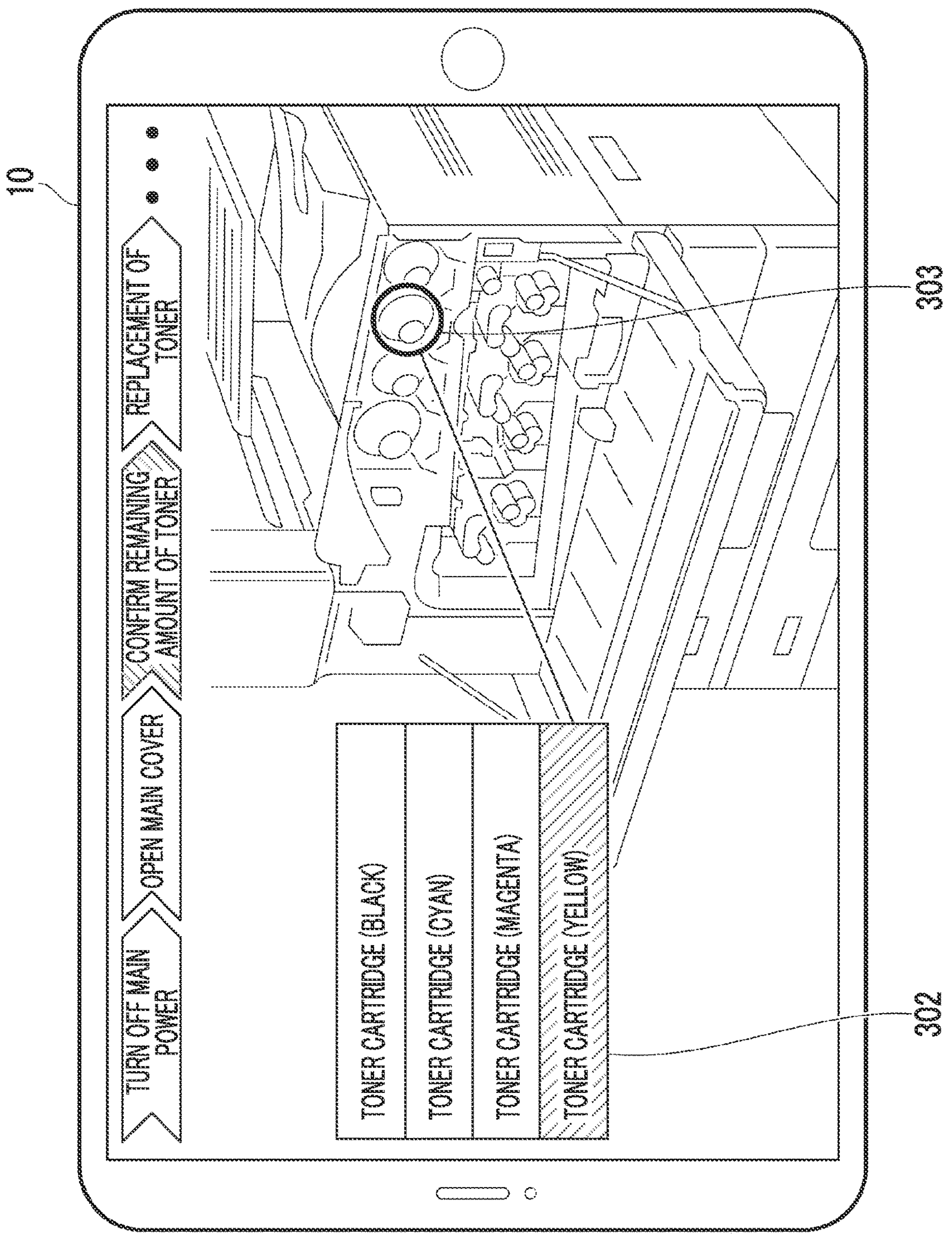
FIG. 7 is a diagram illustrating a display example in a case where an AR manual display unit causes the first user terminal to display an object/component list.

In step S201, a display example in a case where the AR manual display unit 32 causes the first user terminal 10 to display an object/component list will be described with reference to FIG. 7. FIG. 7 is a diagram illustrating a display example in a case where the AR manual display unit 32 causes the first user terminal 10 to display an object/component list.

The AR manual display unit 32 causes the first user terminal 10 to display a work procedure 301 related to work to be performed by the first user. In the example illustrated in FIG. 7, a work step of "checking the remaining amount of toner" in toner replacement work is performed by the first user. The AR manual display unit 32 causes the first user terminal 10 to display an object/component list 302 including objects/components recognized in the work step of "checking the remaining amount of toner" in the work procedure 301. In the example illustrated in FIG. 7, a toner cartridge (yellow) is selected from the object/component list 302, and an actual position of the selected toner cartridge (yellow) is indicated by a circle 303.

Next, the additional information management unit 37 determines whether or not an object/component as a recording target is selected from the objects/components displayed in the list (step S202). In a case where an object/component as a recording target is selected from the objects/components displayed in the list (YES in step S202), the additional information management unit 37 acquires information on the selected object/component (step S203). Next, the object/component recognition unit 31 determines whether or not a specific portion of the selected object/component is designated (step S204). Further, designation of a specific portion is, for example, a case where "document glass" is selected and a scratched portion is selected. The first user can designate a specific portion by selecting "document glass" from the list and pointing a scratched portion of the glass with a finger or the like.

In a case where a specific portion of the selected object/component is further designated (YES in step S204), the additional information management unit 37 generates AR content to be superimposed and displayed on the designated portion (step S205), and the process returns to processing of step S204. In step S205, for example, the additional information management unit 37 generates circular AR content (refer to a circle 312 in FIG. 8) indicating the designated portion by displaying the designated portion so as to surround the designated portion.

In a case where a specific portion of the selected object/component is not further designated in step S204 (NO in step S204), the process proceeds to processing of step S208.

In a case where an object/component as a recording target is not selected from the objects/components displayed in the list in step S202 (NO in step S202), the AR manual display unit 32 causes the first user terminal 10 to display an operation instruction to specify a three-dimensional coordinate for displaying AR content (step S206). In step S206, the AR manual display unit 32 causes the first user terminal 10 to display an operation instruction to specify a three-dimensional coordinate, for example, by marking a target position from a plurality of angles.

Thereby, it is possible to easily designate a depth coordinate of the target when disposing the AR content.

Next, the additional information management unit 37 generates AR content to be superimposed and displayed on the specified three-dimensional coordinate (step S207). Next, the additional information management unit 37 receives input of a title of the additional information, a message, and the like (step S208). In step S208, the AR manual display unit 32 may be configured to display an item to be input by the first user. For example, in a case where work of "checking the remaining amount of toner" is performed, the AR manual display unit 32 causes the first user terminal 10 to display a message for requesting the first user to input "remaining amount of toner".

Next, the AR manual display unit 32 causes the first user terminal 10 to display a [standing-position/view recording] button (step S209). Next, the viewpoint guide unit 34 determines whether or not the [standing-position/view recording] button is pressed (step S210). In a case where the [standing-position/view recording] button is not pressed (NO in step S210), the process returns to processing of step S209.

On the other hand, in a case where the [standing-position/view recording] button is pressed (YES in step S210), the additional information management unit 37 acquires a current position coordinate, a direction, and a lighting state of the first user terminal 10 (step S211). In step S211, the position coordinate of the first user terminal 10 is calculated by a known self-position estimation technique. The direction of the first user terminal 10 is calculated based on, for example, information from an acceleration sensor and a geomagnetic sensor. Further, in a case where the first user terminal 10 has a light emitting function, the additional information management unit 37 acquires a light emitting state of the first user terminal 10.

Next, the viewpoint guide unit 34 detects a rectangular contour from an image obtained by performing imaging, and causes the first user terminal 10 to display a list of the rectangular contours (step S212). Next, the viewpoint guide unit 34 determines whether or not a rectangular contour is selected (step S213). In a case where a rectangular contour is selected (YES in step S213), the viewpoint guide unit 34 receives input of a name of the selected rectangular contour (step S214). In step S214, the viewpoint guide unit 34 receives input of a name as additional information for the selected rectangular contour. On the other hand, in a case where a rectangular contour is not selected (NO in step S213), the process proceeds to processing of step S215.

Next, the viewpoint guide unit 34 determines whether or not selection of a rectangular contour is completed (step S215). In a case where selection of a rectangular contour is completed (YES in step S215), the additional information management unit 37 stores the additional information and the associated information in the additional information management/storage unit 38 (step S216).

On the other hand, in a case where selection of a rectangular contour is not completed (NO in step S215), the process returns to processing of step S212.

In the example illustrated in FIG. 6, the viewpoint guide unit 34 uses a rectangular contour as the mark image. On the other hand, the mark image is not limited thereto. The viewpoint guide unit 34 may be configured to use, for example, as a mark image, a part of a target object having a size larger than a predetermined size.

Figure 8A:
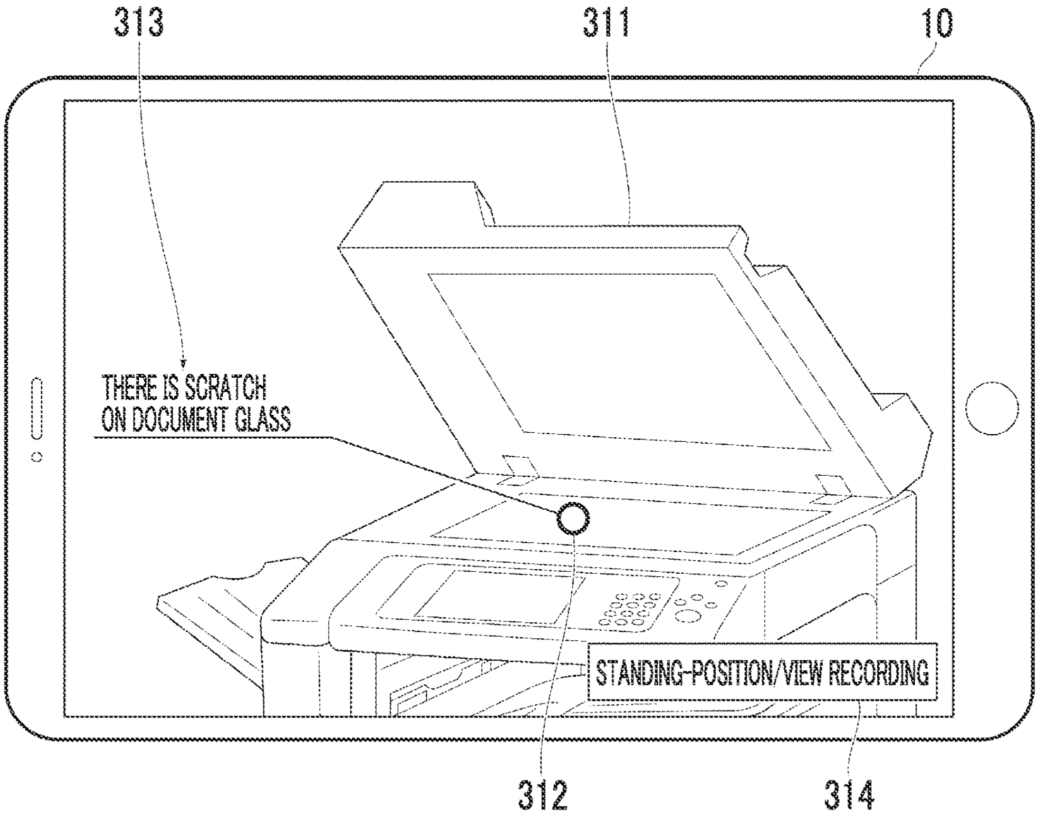
FIG. 8A and FIG. 8B are diagrams illustrating an example of a display screen displayed on the first user terminal in a case of acquiring a mark image corresponding to a part of a target object for which additional information is input by the first user.
Figure 8B:
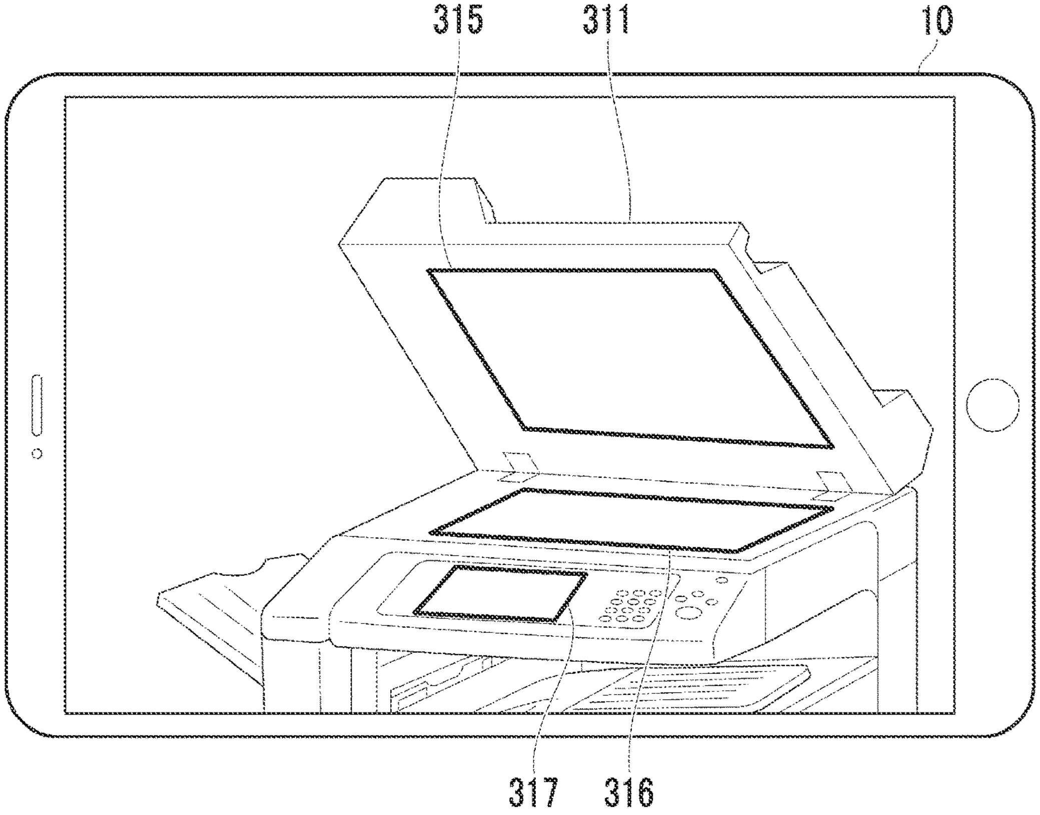

In step S209 to step S214 of FIG. 6, a display screen displayed on the first user terminal 10 will be described with reference to FIG. 8. FIG. 8A and FIG. 8B are diagrams illustrating an example of a display screen displayed on the first user terminal 10 in a case of acquiring a mark image corresponding to a part of a target object for which additional information is input by the first user, FIG. 8A is a diagram illustrating a display screen example in a case of receiving recording of a viewpoint from the first user, and FIG. 8B is a diagram illustrating a display screen example in a case of receiving selection of a mark image from the first user.

In the example illustrated in FIG. 8A, the first user terminal 10 performs imaging of a printing apparatus 311 which is a target object for which the additional information is input by the first user, and displays an image obtained by performing imaging on a screen. The first user selects a portion at which the additional information is to be displayed in step S204 of FIG. 5, and a circle 312 which is the AR content is displayed at the selected portion. In addition, a message 313 of the additional information "document glass is scratched" that is input by the first user in step S208 of FIG. 6 is displayed as content to be displayed at a portion at which the additional information is displayed.

The AR content related to the additional information, such as the circle 312 and the message 313, may not be displayed on the first user terminal 10. In this case, the AR content related to the additional information is displayed only on the second user terminal 20.

In step S209, the AR manual display unit 32 causes the first user terminal 10 to display the [standing-position/view recording] button 314 on a screen. In a case where the first user presses the [standing-position/view recording] button 314, the display screen of the first user terminal 10 is switched to a screen illustrated in FIG. 8B. In step S212 of FIG. 6, the viewpoint guide unit 34 detects rectangular contours 315, 316, and 317 from the image obtained by performing imaging, and causes the first user terminal 10 to display a list of the rectangular contours. The first user may select one of a plurality of candidates, or may select a plurality of candidates.

Confirmation of Additional Information

Figure 9:
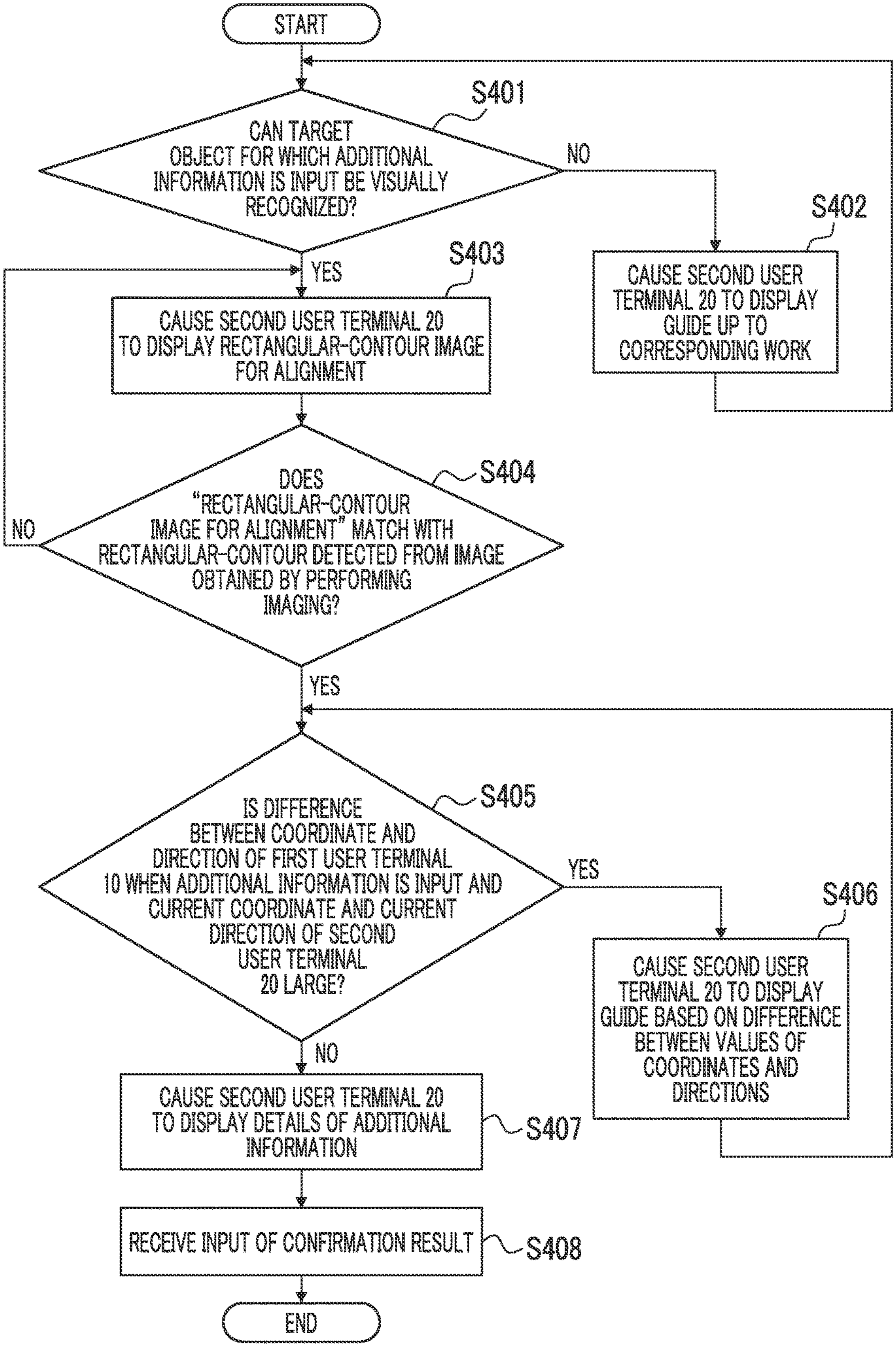
FIG. 9 is a flowchart illustrating an example of a flow of processing in a case where the management server causes the second user terminal to display additional information that is input by the first user and receive confirmation by the second user.

Next, a flow of processing in a case where the management server 30 causes the second user terminal 20 to display the additional information that is input by the first user and receive confirmation by the second user will be described with reference to FIG. 9. FIG. 9 is a flowchart illustrating an example of a flow of processing in a case where the management server 30 causes the second user terminal 20 to display the additional information that is input by the first user and receive confirmation by the second user.

In FIG. 9, first, the object/component recognition unit 31 determines whether or not the target object for which the additional information is input can be visually recognized (step S401). In a case where the target object for which the additional information is input cannot be visually recognized (NO in step S401), the AR manual display unit 32 causes the second user terminal 20 to display a guide up to the corresponding work (step S402). In step S402, the AR manual display unit 32 causes the second user terminal 20 to display the AR manual up to the work procedure in which the additional information is input by the first user, and the process returns to processing of step S401.

Figure 10:
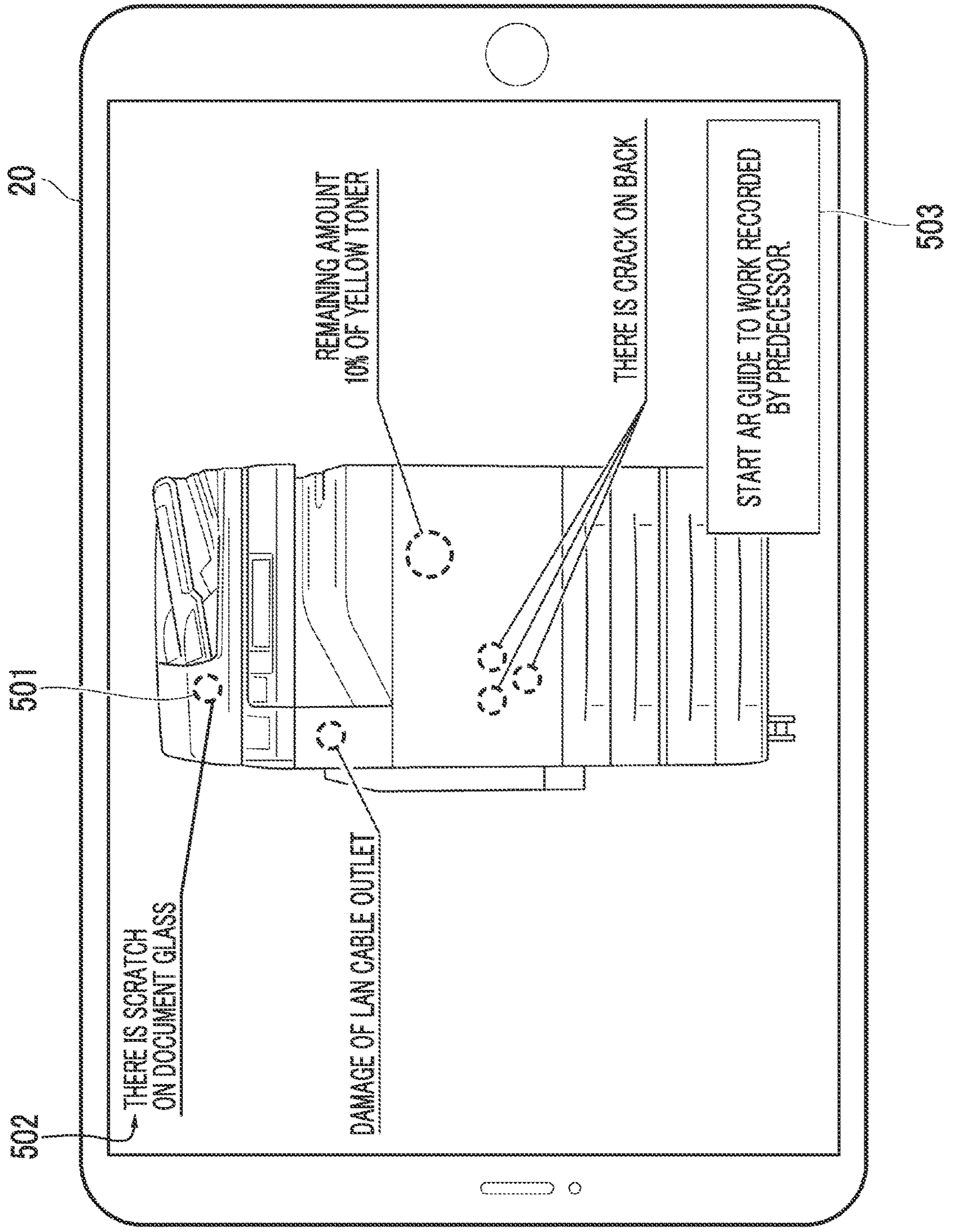
FIG. 10 is a diagram illustrating an example of an image displayed on the second user terminal in a case where a target object for which additional information is input cannot be visually recognized.

A display example of the guide in step S402 will be described with reference to FIG. 10. FIG. 10 is a diagram illustrating an example of an image displayed on the second user terminal 20 in a case where the target object for which the additional information is input cannot be visually recognized. In a case where the target object for which the additional information is input cannot be visually recognized, for example, the additional information display unit 33 displays a broken-line circle 501 on the second user terminal 20, and displays a message indicating that there is a target object for which the additional information is input at a portion which cannot be visually recognized. A display form of the circle 501 is not limited to the broken line, and any form that can be distinguished from the circle 312 in FIG. 8 may be used.

Further, the additional information display unit 33 may display the input additional information 502 for the target object indicated by the circle 501. In the example illustrated in FIG. 10, the additional information 502 of "document glass is scratched" is displayed. As illustrated in FIG. 10, in a case where a plurality of pieces of additional information are input, the pieces of additional information are displayed corresponding to all the portions for which the additional information is input.

In order to visually recognize the target object, the second user presses a "start AR guide up to work recorded by predecessor" button 503. In a case where the button 503 is pressed, the AR manual display unit 32 causes the second user terminal 20 to display guide information up to the corresponding work in which the additional information is input by the first user. The AR manual display unit 32 causes the second user terminal 20 to display, for example, the AR manual used when the additional information is input by the first user. The second user can visually recognize the target object for which the additional information is input by the first user by performing an operation according to the guide.

In a case where the target object for which the additional information is input can be visually recognized in step S401 (YES in step S401), the viewpoint guide unit 34 causes the second user terminal 20 to display a rectangular-contour image for alignment (step S403).

Figure 11:
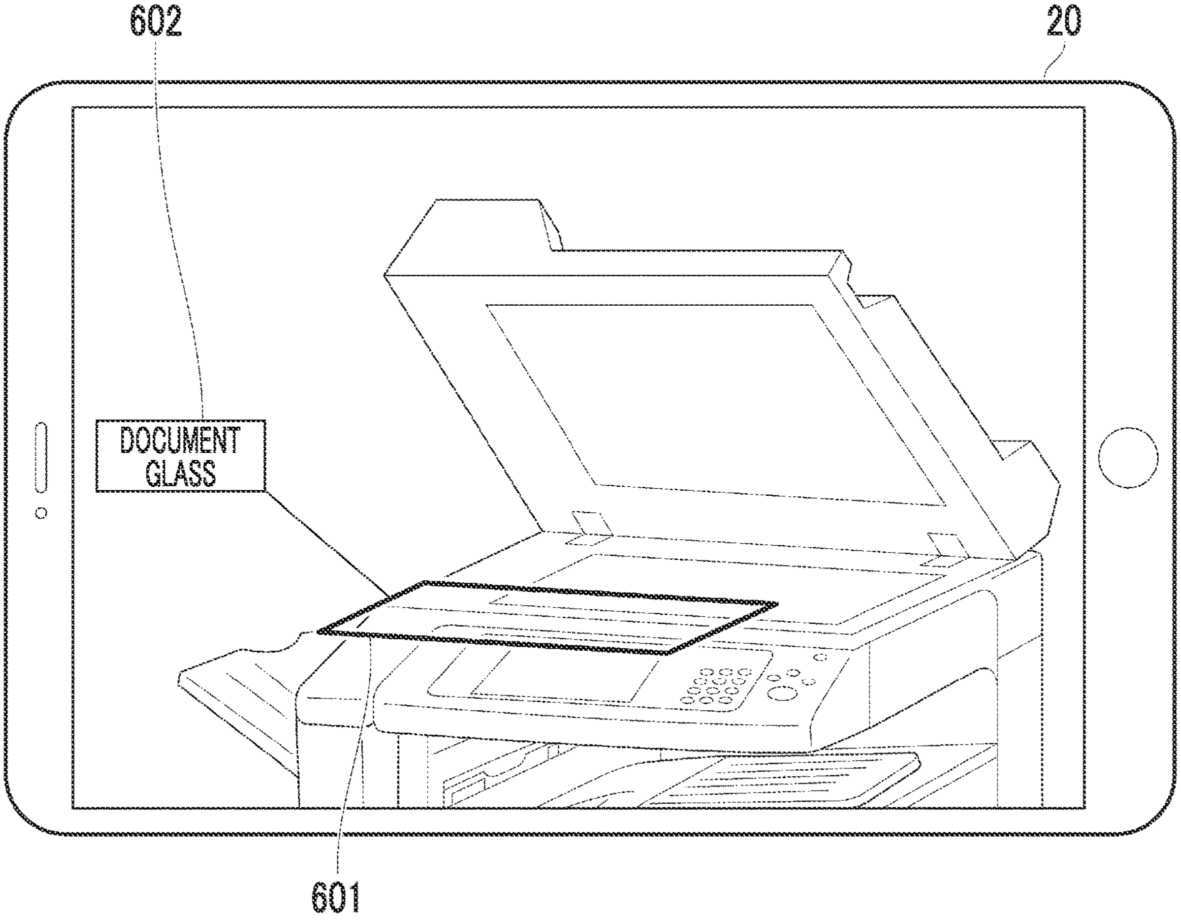
FIG. 11 is a diagram illustrating a display example of a rectangular-contour image for alignment to be displayed on the second user terminal by a viewpoint guide unit.

In step S403, a display example of the rectangular-contour image for alignment to be displayed on the second user terminal 20 by the viewpoint guide unit 34 will be described with reference to FIG. 11. FIG. 11 is a diagram illustrating a display example of a rectangular-contour image for alignment to be displayed on the second user terminal 20 by the viewpoint guide unit 34. The viewpoint guide unit 34 causes the second user terminal 20 to display the rectangular-contour image 601 for alignment. At this time, the viewpoint guide unit 34 causes the second user terminal 20 to display the rectangular-contour image 601 for alignment in accordance with the position on the screen when the mark image is acquired from the first user terminal.

For example, in a case where resolutions of the display screens of the first user terminal 10 and the second user terminal 20 are the identical, the viewpoint guide unit 34 causes the second user terminal 20 to display the rectangular-contour image 601 for alignment on the identical coordinate as the coordinate on the screen when the mark image is acquired from the first user terminal. In a case where resolutions of the display screens of the first user terminal 10 and the second user terminal 20 are different, the viewpoint guide unit 34 calculates a relative position on the screen from the coordinate on the screen when the mark image is acquired from the first user terminal 10 and the display resolution, and causes the second user terminal 20 to display the rectangular-contour image 601 for alignment at the identical relative position.

Next, the object/component recognition unit 31 determines whether or not the "rectangular-contour image for alignment" matches with the rectangular-contour detected from the image obtained by performing imaging (step S404). In a case where the "rectangular-contour image for alignment" does not match with the rectangular-contour detected from the image obtained by performing imaging (NO in step S404), the process returns to processing of step S403.

On the other hand, in a case where the "rectangular-contour image for alignment" matches with the rectangular-contour detected from the image obtained by performing imaging (YES in step S404), the object/component recognition unit 31 determines whether or not a difference between the coordinate and the direction of the first user terminal 10 when the additional information is input and the current coordinate and the current direction of the second user terminal 20 is large (step S405). In a case where it is determined that the difference between the coordinate and the direction of the first user terminal 10 when the additional information is input and the current coordinate and the current direction of the second user terminal 20 is large (YES in step S405), the AR manual display unit 32 causes the second user terminal 20 to display a guide based on the difference between values of the coordinates and the directions (step S406), and the process returns to processing of step S405.

In step S406, the AR manual display unit 32 causes the second user terminal 20 to display a message such as "Please move to the inside" or "Please tilt the terminal to the right".

In a case where it is determined in step S405 that the difference between the coordinate and the direction of the first user terminal 10 when the additional information is input and the current coordinate and the current direction of the second user terminal 20 is small (NO in step S405), the additional information display unit 33 causes the second user terminal 20 to display details of the additional information (step S407).

Next, the additional information management unit 37 receives input of a confirmation result (step S408). For example, the additional information display unit 33 causes the second user terminal 20 to display the details of the additional information and a text field for receiving input of a confirmation result from the second user. The second user inputs the corresponding content in the text field. The additional information management unit 37 acquires the corresponding content that is input by the second user, and stores the corresponding content in the additional information management/storage unit 38.

Further, in step S402, in a case where a list of the pieces of additional information which are input by the first user is displayed on the second user terminal 20, a method of displaying the additional information may be changed depending on whether or not input of the corresponding content from the second user is received. For example, in the case of displaying the additional information for which input of the corresponding content from the second user is received, the additional information display unit 33 displays the additional information with a check mark indicating that confirmation is completed. In addition, the additional information for which input of the corresponding content from the second user is received may not be displayed.

Further, the additional information that is input by a worker and the additional information that is input by a remote assistant may be separately displayed.

Although the exemplary embodiments of the present invention have been described above, the technical scope of the present invention is not limited to the scope described in the above exemplary embodiments. It is obvious that combinations of two or more of the above exemplary embodiments and various modifications or improvements to the above exemplary embodiments are also included in the technical scope of the present invention.

Supplementary Note (((1)))

An information processing system including:

one or a plurality of processors configured to:

- acquire additional information that is input by a first user;
- acquire a mark image corresponding to a part of a target object for which the additional information is input by the first user;
- cause a terminal apparatus of a second user to display the mark image; and
- cause the terminal apparatus of the second user to display the additional information based on a relationship between the mark image and the part of the target object.

(((2)))

The information processing system according to (((1))), wherein the one or the plurality of processors are configured to:

- cause the terminal apparatus of the second user to display the additional information in a case where the mark image and the part of the target object are in a relationship in which it is determined that viewpoints of the first user and the second user substantially match with each other.

(((3)))

The information processing system according to (((2))), wherein the one or the plurality of processors are configured to:

- cause the terminal apparatus of the second user to display the additional information in a case where the mark image and the part of the target object match with each other.

(((4)))

The information processing system according to (((1))), wherein the one or the plurality of processors are configured to:

- cause a terminal apparatus of the first user to display a plurality of candidates as the mark image and receive selection of the first user.

(((5)))

The information processing system according to (((4))), wherein the one or the plurality of processors are configured to:

- receive additional information on the mark image from the first user.

(((6)))

The information processing system according to (((1))), wherein the one or the plurality of processors are configured to:

acquire a position of the mark image displayed on a screen of a terminal apparatus of the first user in a case of acquiring the mark image.

(((7)))

The information processing system according to (((6))), wherein the one or the plurality of processors are configured to:

acquire a resolution of the screen of the terminal apparatus of the first user in a case of acquiring the mark image.

(((8)))

The information processing system according to (((1))), wherein the one or the plurality of processors are configured to:

acquire, in a case where a terminal apparatus of the first user has a light emitting function, a light emitting state of the terminal apparatus of the first user in a case of acquiring the mark image.

(((9)))

The information processing system according to (((1))), wherein the one or the plurality of processors are configured to:

cause, in a case where the part of the target object corresponding to the mark image is not visually recognized on an image obtained by performing imaging by the second user, the terminal apparatus of the second user to display guide information up to a state where the part is visually recognized.

(((10)))

The information processing system according to (((1))), wherein the one or the plurality of processors are configured to:

receive input of confirmation information by the second user.

(((11)))

The information processing system according to claim (((10))), wherein the one or the plurality of processors are configured to:

cause the terminal apparatus of the second user to display a list of the additional information that is input by the first user, and change a method of displaying the additional information depending on whether or not input of the confirmation information from the second user is received.

(((12)))

A program causing one or a plurality of processors to realize functions comprising:

a function of acquiring additional information that is input from a terminal apparatus of a first user;

a function of acquiring a mark image corresponding to a part of a target object for which the additional information is input by the first user;

a function of causing a terminal apparatus of a second user to display the mark image; and a function of causing the terminal apparatus of the second user to display the additional information based on a relationship between the mark image and the part of the target object.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

one or a plurality of processors configured to:

acquire additional information that is input by a first user;

acquire a mark image corresponding to a part of a target object for which the additional information is input by the first user;

cause a terminal apparatus of a second user to display the mark image;

cause the terminal apparatus of the second user to display the additional information based on a relationship between the mark image and the part of the target object;

cause the terminal apparatus of the second user to display the additional information in a case where the mark image and the part of the target object are in a relationship in which it is determined that viewpoints of the first user and the second user substantially match with each other; and determine a relative position from the coordinate on a screen and display the additional information based on the relative position in a case where resolutions of the display screens of the first user terminal and the second user terminal are different.

2. The information processing system according to claim 1, wherein the one or the plurality of processors are configured to:

cause the terminal apparatus of the second user to display the additional information in a case where the mark image and the part of the target object match with each other.

3. The information processing system according to claim 1, wherein the one or the plurality of processors are configured to:

cause a terminal apparatus of the first user to display a plurality of candidates as the mark image and receive selection of the first user.

4. The information processing system according to claim 3, wherein the one or the plurality of processors are configured to:

receive additional information on the mark image from the first user.

5. The information processing system according to claim 1, wherein the one or the plurality of processors are configured to:

acquire a position of the mark image displayed on a screen of a terminal apparatus of the first user in a case of acquiring the mark image.

6. The information processing system according to claim 5, wherein the one or the plurality of processors are configured to:

acquire a resolution of the screen of the terminal apparatus of the first user in a case of acquiring the mark image.

7. The information processing system according to claim 1, wherein the one or the plurality of processors are configured to:

acquire, in a case where a terminal apparatus of the first user has a light emitting function, a light emitting state of the terminal apparatus of the first user in a case of acquiring the mark image.

8. The information processing system according to claim 1, wherein the one or the plurality of processors are configured to:

cause, in a case where the part of the target object corresponding to the mark image is not visually recognized on an image obtained by performing imaging by the second user, the terminal apparatus of the second user to display guide information up to a state where the part is visually recognized.

9. The information processing system according to claim 1, wherein the one or the plurality of processors are configured to:

receive input of confirmation information by the second user.

10. The information processing system according to claim 9, wherein the one or the plurality of processors are configured to:

cause the terminal apparatus of the second user to display a list of the additional information that is input by the first user, and change a method of displaying the additional information depending on whether or not input of the confirmation information from the second user is received.

11. A non-transitory computer readable medium storing a program causing one or a plurality of processors to realize functions comprising:

acquiring additional information that is input from a terminal apparatus of a first user;

acquiring a mark image corresponding to a part of a target object for which the additional information is input by the first user;

causing a terminal apparatus of a second user to display the mark image;

causing the terminal apparatus of the second user to display the additional information based on a relationship between the mark image and the part of the target object;

causing the terminal apparatus of the second user to display the additional information in a case where the mark image and the part of the target object are in a relationship in which it is determined that viewpoints of the first user and the second user substantially match with each other; and determining a relative position from the coordinate on a screen and display the additional information based on the relative position in a case where resolutions of the display screens of the first user terminal and the second user terminal are different.

12. An information processing method comprising:

acquiring additional information that is input from a terminal apparatus of a first user;

acquiring a mark image corresponding to a part of a target object for which the additional information is input by the first user;

causing a terminal apparatus of a second user to display the mark image;

causing the terminal apparatus of the second user to display the additional information based on a relationship between the mark image and the part of the target object;

causing the terminal apparatus of the second user to display the additional information in a case where the mark image and the part of the target object are in a relationship in which it is determined that viewpoints of the first user and the second user substantially match with each other; and determining a relative position from the coordinate on a screen and display the additional information based on the relative position in a case where resolutions of the display screens of the first user terminal and the second user terminal are different.

* * * * *